Dec. 4, 1951 P. R. GROSSMAN ET AL 2,577,655
FLUID HEATER CONTROL
Filed June 5, 1948 2 SHEETS—SHEET 1

INVENTORS
PAUL R. GROSSMAN
AND JACK F. SHANNON
BY
Raymond W. Junkins
ATTORNEY

FIG. 4

Patented Dec. 4, 1951

2,577,655

UNITED STATES PATENT OFFICE 2,577,655

FLUID HEATER CONTROL

Paul R. Grossman, Irvington, N. J., and Jack F. Shannon, Euclid, Ohio, assignors to The Babcock & Wilcox Company, Rockleigh, N. J., a corporation of New Jersey Application June 5, 1948, Serial No. 31,258

34 Claims. (Cl. 263—19)

Our present invention relates in general to the operation and control of fluid heaters of the type in which the heat transfer medium consists of a fluent gas-pervious mass of refractory material which is first heated by the passage of a heating fluid in heat transfer relation therewith and is then cooled by contact with fluid to be heated; and more particularly to fluid heaters of the character illustrated and described in which the mass of heat transfer material in the form of pellets moves by gravity downwardly through a series of superposed heating and cooling chambers or zones connected by one or more throats of reduced flow area but structurally unobstructed, elevating the pellets to a point above the upper chamber, and again allowing them to move by gravity through the several chambers.

The heater may comprise a multiplicity of superposed refractory lined chambers, one or more of which may be adapted for the continuous heating of refractory pellets while one or more of the chambers is adapted for the heating of fluids by contact with the descending stream of hot pellets. The refractory pellets are arranged for gravity flow through the chambers and connected throat sections and then for external return from the lowermost chamber to the uppermost chamber. Certain arrangements of control and the operation of such a heater form particular features of our present invention.

In the present example, pellets are heated in an upper chamber by contact with a countercurrent stream of hot combustion gases after which they pass by gravity into a treating chamber where they treat the fluid being processed. A third chamber is positioned below the treating chamber to effect a preheating of the air for combustion purposes in connection with the pellet heating chamber and to cool pellets therein. Pellets emerging from the third or lowermost chamber are sufficiently cool to be handled by ordinary metallic elevator equipment external of the heat transfer chambers. Thus the residual heat in the heat transfer material or pellets can be recovered by direct contact with air for use as an element of combustion in the generation of a heating fluid for the upper chamber.

The general object of our invention is the provision of a method of and apparatus for operating and controlling fluid heating apparatus of the character disclosed, for continuously heating the fluid under pressure at high capacity to a uniform final temperature in a range whose upper temperature limit is dependent only upon the physical properties, such as the fusing temperature, of the refractory materials employed, with little or no contamination of the fluids being heated by the heating fluid employed and vice versa, without subjecting any included metallic parts present to unsafe operating temperatures or requiring special corrosion and heat resistant alloys for metal operating temperatures over 900° F., and with a relatively high overall thermal efficiency.

A particular object is to provide a control system for the apparatus described which is characterized by its ability to maintain balanced fluid pressures within the apparatus to prevent intermingling of the fluids from one chamber to another.

A still further object of the invention is to provide an apparatus adapted for use in a continuous process characterized by its ability to transfer high temperatures to a fluid being heated at a higher rate of heat transfer than heretofor practical. Still another object is to provide a process and apparatus of the above noted type in which the reaction time can be controlled within narrow limits. A further object is to protect against over-heating of the chamber lining.

One particular embodiment of our invention is illustrated and described in connection with the synthesis of $CS_2$, where sulphur vapor is superheated to the desired reaction temperature in the heat exchanger and is then passed into a separate reaction chamber filled with charcoal where the carbon disulfide reaction takes place. A further embodiment is described in connection with the superheating of steam. It will be understood however that these are by way of example only and are not to be taken as limiting. The arrangement might equally as well be used in the thermal conversion of liquid or gaseous hydrocarbons at high temperatures and low pressures in which the temperature in the reaction zone can be controlled within narrow limits thereby permitting efficient and consistent cracking of the hydrocarbon feed.

In the drawings it has appeared unnecessary to complicate the showing by details of the construction of the heat exchanger or of the elevator system for returning the pellets from the exit of the lowermost chamber to the inlet to the uppermost chamber. Such constructional details are known in the art and form no part of the present invention. Thus the showing of the drawings is entirely diagrammatic insofar as the size, shape and general constructional arrangement of the principal apparatus is concerned. The apparatus which is concerned with the control of operation of such a heater unit, and to which our invention is particularly directed, will be explained in detail.

The heating unit illustrated in the drawings is constructed and designed for the use of vapors or gaseous heating and heated fluids under pressure and as shown comprises as its main part an upper heating chamber 10 normally substantially filled with a downwardly moving fluent gas-pervious mass of refractory heat transfer material 13 to be heated by high temperature gases passing therethrough. There is shown a connected subjacent heat absorbing or reaction chamber 11 arranged to receive and normally substantially completely filled with heated refractory material 13 from the upper chamber, and in which the heated refractory material is utilized for heating a second fluid, in the present embodiment a vaporous fluid such as sulphur, to a predetermined temperature.

Below the chamber 11, and connected thereto, is a third chamber 12 arranged to receive and normally substantially completely filled with heated refractory material 13 from the middle chamber 11, and in which the heated refractory material is utilized for heating a third fluid, which in the present embodiment is air, to be utilized as an element of combustion for heating the refractory material in the uppermost chamber 10.

An elevating system is provided for receiving the cooled refractory material from the lowermost chamber 12 and returning it to the upper part of the uppermost chamber 10 and comprises an air lift system having a principal conduit 14. The air lift conduit 14 is connected at its lower end to an air blower 15 driven by motive means 16 which may be under speed control. Joining the conduit 14 is a branch 17 from the exit of the chamber 12 and the branch 17 may be provided with controllable feeder means for variably allowing the pellets of refractory material 13 to feed from the chamber 12 into the air stream passing upwardly through the conduit 14. By such means the rate of gravity flow of the material 13 downwardly through the chambers 10, 11, 12 may be regulated and thus the time of contact of the pellets with the different fluids may be controlled. Such control forms no part of the present invention.

At an upper location the conduit 14 discharges its mixture of air and refractory pellets 13 into a pellet collector 18 having a branch 19 arranged for gravity flow of the pellets into the top of the chamber 10. Air is discharged from the collector 18 to the atmosphere or may be recycled.

An annular combustion chamber 26 is supplied with fuel through a conduit 27 and with air for supporting combustion through a conduit 28. The heated products of combustion from the combustion chamber 26 are admitted through a lower portion of the chamber 10 to pass upwardly through the interstices of the gas-pervious fluent mass 13 in intimate counter-flow contact with the descending pellets whereby the pellets are heated to a high temperature and the gases leave through the flue gas outlet 29 at a relatively low temperature. The highly heated pellets 13 move downwardly in a column through chamber 10 and a throat 30 into the subjacent chamber 11. The fluid to be heated in the chamber 11, such as air, steam, naphtha, or the like (in the present embodiment being sulphur vapor), is introduced through a conduit 31 to a lower portion of the chamber 11 under a predetermined pressure and passes upwardly through the interstices between the descending pellets 13 in the chamber 11 where it is heated in counter-flow heat transfer and then passes out at a desired temperature through an outlet conduit 32.

The pellets 13 move slowly by gravity from a lower portion of the chamber 11, through the throat 33, into the upper portion of the chamber 12 where they are further cooled by heat transfer to combustion air admitted through a conduit 34 to a lowermost portion of the chamber 12 and passing upwardly through the interstices of the fluent gas-pervious material 13 to exit near the top of the chamber 12 into a conduit 28 for supplying heated combustion air to the furnace chamber 26.

From the bottom of the chamber 12 the pellets 13 discharge through the conduit 17 and are returned by air lift to reenter the chamber 10 at 19.

The relative pressures in the chambers 10, 11 and 12, as well as the flow between the chambers, or lack of flow, is controlled by provisions disclosed in a co-pending application of Ervin G. Bailey and Ralph M. Hardgrove, Serial No. 502,580, filed September 16, 1943, now Patent No. 2,447,306, dated August 17, 1948, of which certain control features herein disclosed constitute improvements thereover. Connected to opposite ends of the throat section 30 are pressure pipes 35, 36 joining a differential pressure controller 37 which is arranged to position the flow regulating dampers 38 and 39. Connected to opposite ends of the throat 33, through pipe connections 40, 41 is a differential pressure controller 42 arranged to position a damper or valve 43 controlling the rate of supply of cold combustion air through the conduit 34 to the heating chamber 12.

In general the differential pressure controllers 37 and 42, through positioning of the dampers or valves 38, 39, 43, perform the functions of so regulating the pressures in the chambers 10, 11, 12, as to maintain a balanced pressure at each end of the throats 30 and 33 and thereby substantially prevent any interflow of fluid from one of the chambers 10, 11 or 12 to another. The static pressures in the several chambers and throats will not however necessarily be the same due to pressure drop through the individual chambers. Such provision minimizes the dilution of the fluid in any chamber by that from another chamber. Furthermore, it obviates the necessity of any gate or valve structure in the throats 30 or 33, permitting free gravity egress of pellets from an upper chamber to a lower chamber without substantial fluid passage from one fluid chamber to another through the interstices of the gas-pervious fluent mass of refractory pellets passing by gravity downwardly from chamber 10 through throat 30 into chamber 11 and thence from chamber 11 through throat 33 into chamber 12. More will be said a little later in regard to the particular operation of the mentioned dampers by the differential pressure controllers 37 and 42.

In the particular embodiment being described the sulphur vapor entering the chamber 11 through the conduit 31 is heated to a desired temperature and discharged through a conduit 32 to a charcoal reactor chamber 44 from which the resultant product passes to a condenser 45 and pump 46 as carbon disulfide the desired end product. We have preferably shown the damper or valve 39 at the exit of the reactor chamber 44 to include the flow resistance of the reactor in the flow path under regulation of the damper 39.

It will be noted that the damper 38, controlling discharge of the flue gases from the chamber 10 thereby controls back pressure upon the chamber 10 while control of damper 39 tends to control pressure at the exit of the chamber 11. Thus control of the dampers 38, 39 are effective in controlling the pressure within the chamber 10 and including the throat 30 to the uppermost portion of the chamber 11. Preferably the dampers 38 and 39 are controlled in parallel and/or sequentially.

The controller 37 and dampers 38, 39 are pneumatically operated and are arranged for sequential operation so that over one range of static pressure, as measured by the controller, the damper 38 is positioned and over another range of static pressure the damper 39 is positioned. One manner of accomplishing such sequential operation with a pneumatically actuated control system is to arrange a pneumatic power means for positioning the damper 39 in a power pressure range of 5 to 20 p. s. i. control pressure as delivered thereto by regulation of the controller 37 while the damper 38 is operable in a power pressure range of 20 to 50 p. s. i. control pressure. Thus with the controller 37 adjusted to control air pressure to the elements 38, 39 in proportion to the pressure differential across the length of the throat 30 a minor departure in throat pressure differential will impose a control air pressure upon the damper 39 sufficient to regulate it. An increase in the pressure differential effective upon the controller 37 will eventually reach the limit of adjustment of the damper 39 which would correspond to the 20 p. s. i. air pressure suggested and any further increase in pressure differential will actuate the damper 38.

The initial greatest and quickest effect upon neck differential is obtained by the operation of the flue gas damper 38. In view of the fact that the reactor 44 has a low pressure drop the damper 39 is preferably located at the exit of reactor 44. This allows pressure to build up in the recovery apparatus external to the chamber 11 and permits the stack damper 38 to operate. By sequentially operating one of the dampers at a time we avoid cycling by either. For most operations damper 39 is the only one which needs to be throttled. The only time when damper 38 needs to be throttled is when there is some hang-up in the reactor, when conditions are abnormal. One or the other of the dampers will be open at all times.

The two dampers would be operated from a singe loading pressure with the reactor damper 39 opening first then when it is wide open the stack damper 38 would start closing. The stack damper would be preferred in the open position to prevent readjustment of a flue gas bleed from the stack which is used to clean dust from the pebbles.

Figures 1, 2, 3:
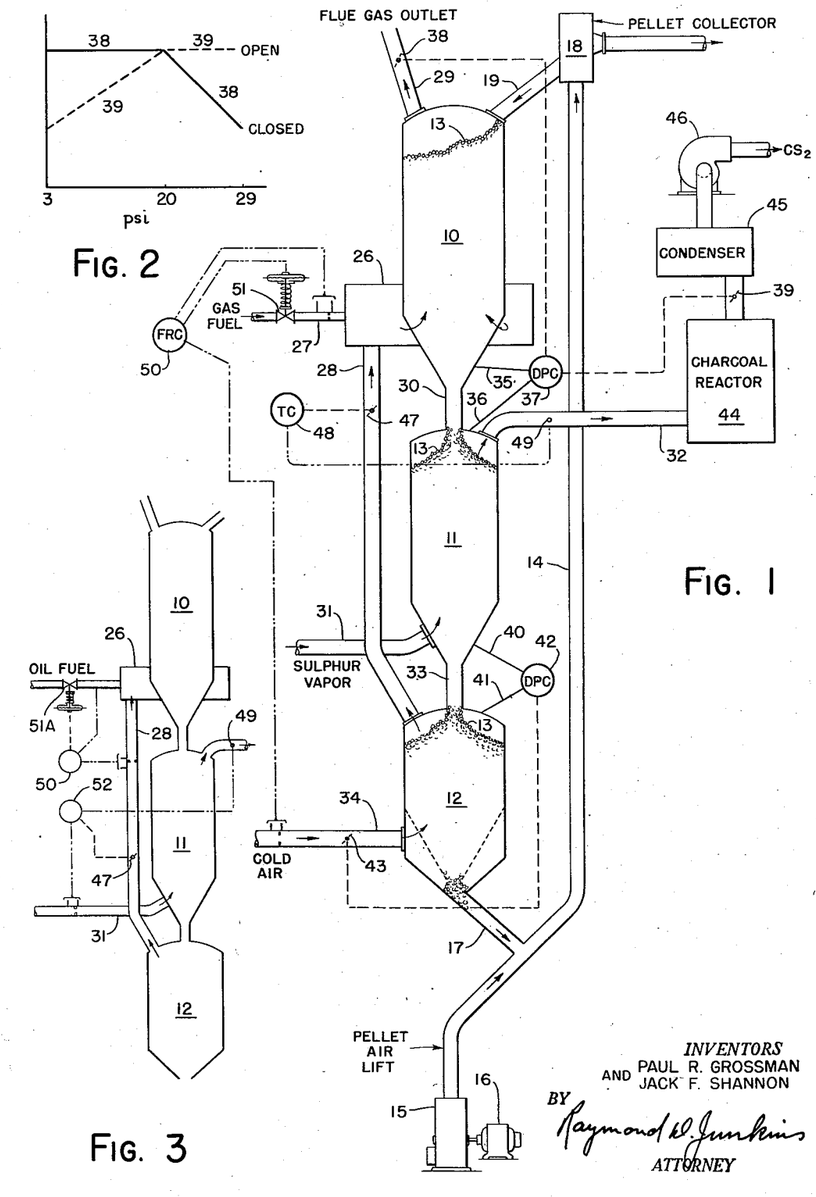
Fig. 1 is a diagrammatic showing, in elevation, of a three chamber heater to which one arrangement of our control system has been applied.
Fig. 2 is a graph in connection with Fig. 1.
Fig. 3 is a diagrammatic arrangement showing a modification of the control.

Referring to Fig. 2 we have shown as an example that the pneumatic loading pressure for operating the dampers 38 and 39 may have a controllable range of 3 to 29 p. s. i. The stack damper 38 is open over a pressure range of 3 to 20 p. s. i. As the pressure increases above that point the damper 38 begins to close until when the pressure of 29 p. s. i. is reached the damper 38 is fully closed. In the meantime, at a pressure of 3 p. s. i. the reactor damper 39 begins to open and is fully opened when the pressure reaches 20 p. s. i. It thereafter remains open. Thus, the system might start with the stack damper 38 wide open and with the reactor damper 39 closed.

The loading pressure produced by the differential pressure controller 37 and plotted in Fig. 2 is due to an increase in pressure at line 36 over that at line 35. As this differential increases, representative of a preponderance of pressure at the lower end of neck 30 over that at the upper end of neck 30, the loading pressure developed by 37 will increase from 3 to 29 p. s. i. for example. As the differential pressure thus increases the loading pressure increases thus first opening damper 39 to relieve the pressure at 36 and if such pressure continues to predominate over that at 35 the controller, when damper 39 is wide open, begins closing off on damper 38 to build up the back pressure at 35. Of course it is not expected that conditions would ever obtain wherein the stack damper 38 would be closed off and thus prevent the escape of products of combustion from the chamber 10. This could obviously be prevented by providing mechanical stops for the damper mechanism or by limitation of the air loading pressure effective in operating the damper.

Assuming again that pressure within the chamber 11 has increased, due perhaps to an increased supply of fluid through the conduit 31, then the pressure at connection 40 will predominate over that at 41 and the differential pressure controller 42 will tend to open damper 43 to build up the pressure in chamber 12 and prevent fluid from chamber 11 passing downwardly through the throat 33. During operation however the same results may be accomplished by the automatic positioning of a damper 47 located in the hot air conduit 28 and under the control of a temperature controller 48 which is sensitive to a temperature measuring device 49 located at the exit of the chamber 11 in the conduit 32. Thus the rate of supply of combustion air to the furnace section 26 is controlled responsive to temperature of the heated fluid at the location 49. The position of the damper 47 within the conduit 28 may vary the back pressure in the upper portion of the chamber 12 and this in turn effective upon the differential pressure controller 42 will result in a repositioning of the damper 43.

A flow ratio controller 50 is sensitive to the rate of flow of cold air through the conduit 34 and to the rate of flow of fuel through the conduit 27. Presumably the same air for combustion passes through the conduit 34 as through the conduit 28 but we preferably measure it in the conduit 34 where it is under a lower more uniform temperature condition. The controller 50 performs the function of controlling a valve 51 to maintain desired ratio between the supply of fuel and the supply of air for combustion to the chamber 26. Primarily the rate of supply of air, by means of the damper 47, sets the demand index for combustion rate and thereby for heating of the heat transfer material 13 within the chamber 10. This is under control then of the temperature responsive element 49 as previously mentioned. Having established the desired rate of supply of combustion air then the ratio controller 50 causes a positioning of the fuel valve 51 to maintain desired proportionality between the supply of fuel and the supply of air for combustion.

In general, the load on the unit of Fig. 1 is the rate of supply of sulphur vapor through the conduit 31 to the chamber 11. This basically establishes the pressure condition within the chamber 11. The relation in pressures between the chambers 11—10 and the chambers 11—12, effective upon the controllers 37 and 42 respectively, result in a repositioning of the dampers 38 and 39, or 43, to so control the pressures within the chambers 10 and 12 as to minimize pressure differential across the throat 30 and across the throat 33 and thus prevent flow of fluid from one chamber to another. At the same time the desideratum of final temperature of the heated fluid, at the location 49, controls the basic supply of a heating element to the chamber 10 through a positioning of the damper 47 in the combustion air line. Any change in the rate of supply of combustion air is reflected upon the controller 50 which proportions fuel supply thereto for proper combustion efficiency within the chamber 26. It will be appreciated that any or all of the mentioned control functions and operations may occur simultaneously or sequentially.

In Fig. 3 we have shown a slight modification of our invention wherein the control of the air damper 47 is conjointly responsive to temperature of the heated fluid at the location 49 and to the rate of supply of fluid to be heated entering through the conduit 31. A controller 52, diagrammatically shown as responsive to such temperature and rate of flow, is arranged to position the damper 47 and thus regulate the supply of combustion air responsive not only to rate of supply of fluid to be heated to the chamber 11 but also responsive to the final outlet temperature of such fluid after it has been heated. If the rate of fluid to be heated varies or if the temperature of the fluid after it has been heated deviates from desired value, then either change in condition will cause a readjustment of the damper 47 and a revision of the rate of air flowing through the conduit 28 to the combustion chamber 26.

In manner similar to that shown in Fig. 1 the fuel supply valve 51A is under the control of a ratio controller 50 which is responsive to rate of flow of combustion air passing through the conduit 28 and also to an indication of rate of supply of fuel to the combustion chamber. In this embodiment the fuel may be fuel oil and a single pressure taken from the conduit following the regulating valve 51A is useful as a measure of rate of supply.

Figure 4:
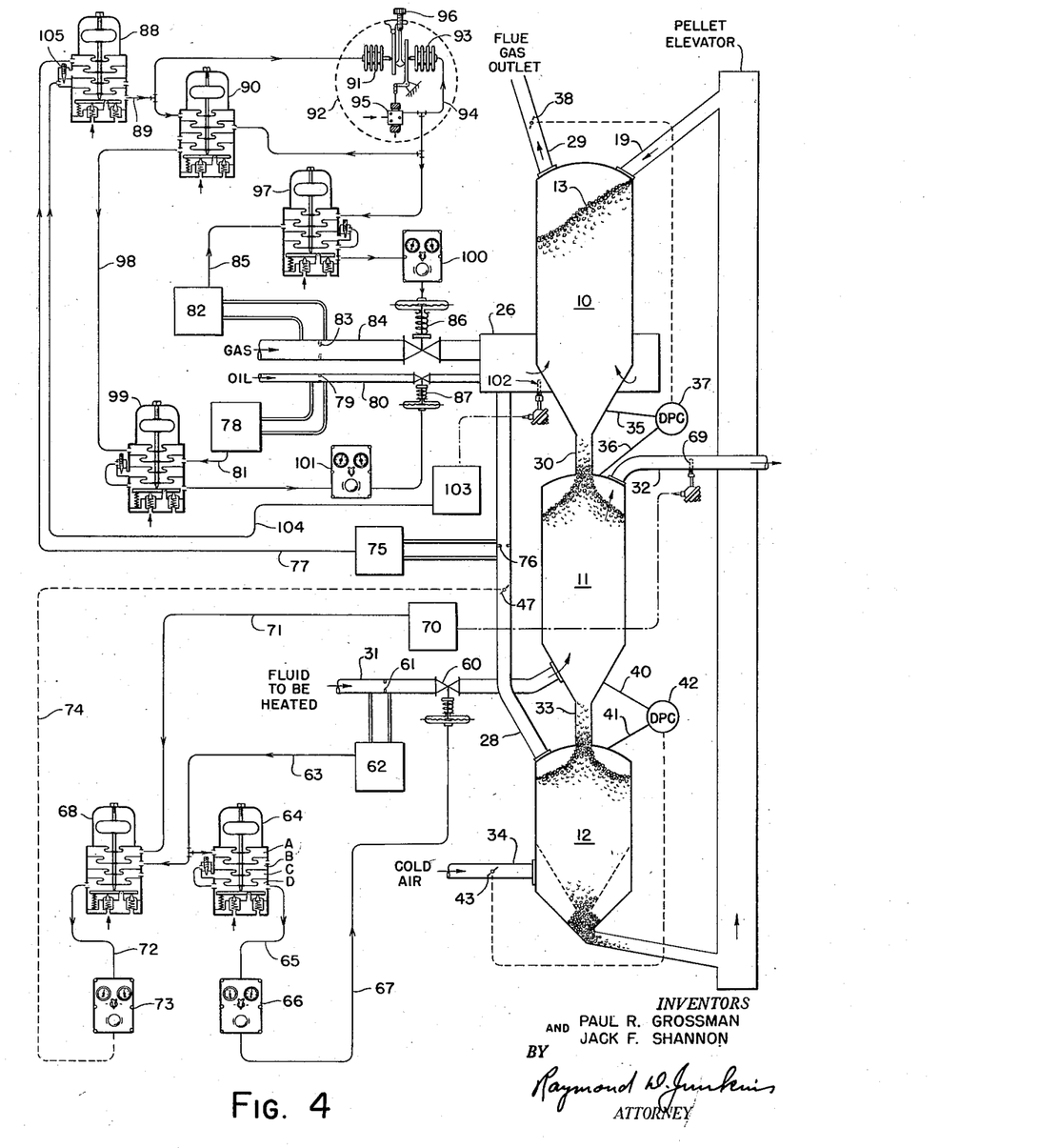
Fig. 4 is a diagrammatic elevation of a further embodiment of our invention.

In Fig. 4 we have chosen to illustrate a further embodiment of our invention wherein a fluid such as steam to be heated is admitted to the chamber 11 through the conduit 31 and may be superheated therein. The pellets in the chamber 10 are preferably heated by the products of combustion generated in the chamber 26 by two relatively dissimilar fluid fuels such, for example, as gas and oil; where one of the fuels, preferably the less expensive, is utilized to its full availability and is supplemented by the more expensive fuel only when necessary to meet the heat demand.

As a specific example, steam is admitted through the conduit 31 at a pressure of 25 p. s. i. saturated and desirably leaves through the conduit 32 at a total temperature of 2300° F. Inasmuch as the steam is to be used for process work it is highly essential that the final steam temperature be maintained uniform or it will affect the process. Another requisite is that the temperature of the lining of the furnace chamber 10 should be maintained within predetermined limits as excessive lining temperature will result in deterioration of the furnace.

It is expected that the cheaper gas fuel will be available over a range of from about 40% to 100% heat requirement and is to be supplemented when necessary by more expensive oil fuel so that some operation will be with zero oil fuel to a maximum of 60% oil heat. The gas and oil supply pressures will however be held substantially constant. The control may be manually adjusted to establish the ratio of oil to gas in accordance with availability and thereafter such ratio will be maintained under varying load demands.

In general, a butterfly damper 47 in the heated air supply line 28 is positioned from a steam temperature controller, the steam temperature controller establishing an air loading proportional to any variation in steam temperature from a set standard. The combustion air past the damper 47 is measured and the correct amount of gas and fuel oil is then provided by positioning the gas and fuel oil control valves in accordance with the total amount of air entering the furnace.

A ratio controller 92 is provided so that the desired proportions of gas to oil can be varied by the operator as desired. As the ratio is changed, the air loading pressure to each of the control valves is also changed thereby providing the correct amount of each fuel for the total amount of combustion air.

The furnace temperature control consists of a furnace temperature recorder-controller 103 establishing a loading pressure which functions to decrease the amount of fuel fired so as to bring the furnace temperature down to the desired temperature. This control is, therefore, actually a limiting control inasmuch as it will function to reduce the total amount of fuel being fired only if a preset temperature is exceeded.

In general, as in Fig. 1, balanced pressures are maintained in the three superposed chambers 10, 11 and 12 to prevent passage of the heating or heated fluid through the neck portions 30 and 33 from one chamber to another. The differential pressure controller 37, connected across the neck 30 by pipes 35, 36, is arranged to position the damper 38 in the flue gas outlet duct 29. Similarly the differential pressure controller 42 is connected across the neck or throat 33 by the pipes 40, 41 and is arranged to position the damper 43 in the cold air supply duct 34. In this embodiment control of pressure within the treating chamber 11 is had through a positioning of a steam control valve 60 regulating the rate of supply of steam to the chamber 11 through the conduit 31. We thus primarily establish the fluid pressure within the chamber 11, through a control rate of supply of steam to the chamber, then so readjust the throttling position of the dampers 38 and 43, in accordance with pressure relations across the necks 30, 33 as to establish desirable static pressures within the chambers 10 and 12 to the end that the pressures within the three chambers will be balanced whereby a minimum of transfer of fluid will be effected between the chambers 10, 11 and 12 through the necks 30 and 33. Such operation minimizes loss of steam from the chamber 11 into the chambers 10 or 12 or dilution of the steam by passage of combustion gases from the chamber 10 downwardly through the neck 30 or dilution by upward passage of heated air from the chamber 12 through the neck 33 into the chamber 11.

To regulate the rate of supply of steam through the conduit 31 we provide a constant flow control for the valve 60. Located in the conduit 31 is an orifice 61 producing a pressure differential bearing a definite relation to rate of flow of steam admitted to the chamber 11. Responsive to such pressure differential is a rate of flow meter 62 arranged to provide a pipe 63 with a pneumatic loading pressure directly representative of rate of steam flow.

The pneumatic loading pressure established in the pipe 63 is subjected upon the A chamber of a standardizing relay 64 whose B chamber is open to atmosphere and whose C and D chambers are connected by a flow bleed passage. The relay 64 establishes a control pressure in its D chamber, effective through pipe 65, selector valve 66 and pipe 67 upon the diaphragm motor valve 60 for positioning the same.

The arrangement is such that, upon a departure of the pressure differential and thereby the rate of flow through the conduit 31 from the desired value, an immediate and proportional change takes place in the positioning of the valve 60 in a direction tending to restore the pressure differential and rate of flow to the desired preset value. Thereafter the standardizing relay 64 operates to gradually position the valve 60 until the rate of flow reaches the predetermined desired value. The standardizing relay 64 is of a type described and claimed in Patent 2,098,914 to Harvard H. Gorrie, while the selector valve 66 is described and claimed in Patent 2,202,485 to E. W. Fitch. The selector valve provides a convenient means for transferring operation of the valve 60 from automatic to manual control if that is desired in starting up or shutting down the unit. The flow meter controller 62 is preferably provided with adjustments whereby the operator may preset the rate of flow of steam he desires to be thereafter maintained by the constant flow control system just described.

The basic factor in the superheating of the steam is the temperature of the pellets passing through the chamber 11 which are contacted by the steam in counterflow passage from conduit 31 to conduit 32. Obviously the temperature to which the pellets are heated in chamber 10 will depend upon the combustion gases supplied to chamber 10 from the combustion zone 26 and in turn the heat so supplied may be controlled by regulating the rate of supply of fuel and/or air for combustion. Inasmuch as the availability of one of the fuels may vary and therefore the proportion of the two fuels may vary we choose to primarily control the rate of supply of heated combustion air through the conduit 28 and then to proportion the total fuel to the air. Air is a fuel just as much as is gas or oil and for theoretical combustion the amount of air necessary to liberate 10,000 B. t. u. will remain substantially unvarying regardless of the proportions of gas to oil fuel firing.

For controlling the rate of supply of air for combustion, and thereby the heat rate to chamber 11, we employ a measure of heat demand namely the rate of flow of steam to be heated by the pellets in chamber 11 and with a secondary or check-back control from a measure of temperature of the steam leaving the conduit 32 which is of course the final control factor to be satisfied.

The pneumatic pressure in pipe 63, representative of rate of steam flow to chamber 11, is subjected upon the B chamber of an averaging relay 68. For measuring the total temperature of the steam leaving chamber 11 through conduit 32 we provide a temperature sensitive element 69 actuating a temperature measuring controller 70 arranged to establish in a pipe 71 a pneumatic loading pressure representative of final steam temperature. The pipe 71 is connected to the A chamber of relay 68. The D chamber of relay 68 provides a control pressure in the pipe 72 acting through a hand-automatic selector valve 73 and pipe 74 to position the damper 47 to control the rate of supply of heated combustion air through the conduit 28.

The action is such that the total air supplied for combustion in the furnace 26 is controlled primarily in accordance with load upon chamber 11, i. e. the rate of supply of steam to be superheated in chamber 11, and then readjusted from a measure of final steam temperature to insure that the leaving temperature of the steam is as desired. Desirably we then proportion the total fuel supply to the rate of combustion air supply to obtain most efficient combustion while satisfying heat requirements.

The fuel control system is of the metering type. Total air for combustion is measured by a rate recorder-controller 75 sensitive to the pressure differential produced by an orifice 76 located in conduit 28; and providing a pneumatic loading pressure in the pipe 77 representative of rate of flow of heated combustion air. A similar rate recorder-controller 78 is sensitive to the pressure differential produced by an orifice 79 located in the oil supply conduit 80, and provides a pneumatic loading pressure in the pipe 81 representative of rate of supply of oil fuel to the combustion chamber 26. Likewise the rate recorder-controller 82 is sensitive to the pressure differential produced by an orifice 83 located in the fuel gas supply conduit 84, and provides a pneumatic loading pressure in the pipe 85 representative of rate of supply of gas fuel to the combustion chamber 26.

The gas fuel pipe 84 is provided with a pneumatically actuated control valve 86, while the oil fuel pipe 80 has a similar pneumatically actuated control valve 87. The two fuel control valves 86, 87 are primarily controlled in parallel in accordance with the loading pressure set up in the pipe 77 as a measure of total air supplied for combustion. The relative opening of the valves 86, 87 is however in predetermined ratio in accordance with the hand set desired proportion of oil to gas for any load demand.

It will be seen that the pipe 77 joins the A chamber of an averaging relay 88 which produces, in a pipe 89, an output pressure directly proportional to that which is subjected upon the A chamber. The loading pressure in the pipe 89 is subjected upon the A chamber of a differential relay 90 and is simultaneously subjected within a bellows 91 of a ratio controller 92.

In the ratio controller 92 the bellows 91 has an opposing bellows 93 supplied with pressure from a pipe 94 under the control of a pneumatic pilot valve 95. Between the bellows 91, 93 is an adjustable fulcrum arm 96 providing ratio varying means which may be set manually. The arrangement is such that the operator may move the fulcrum 96 to a calibrated position whereby the pressure within the pipe 94 and bellows 93 is equal to that within the bellows 91 and the ratio between the two pressures may be 1:1. If desired the operator may so move the calibrated fulcrum 96 that the ratio may be 2:1 whereby the pressure within the bellows 93 is only one half of that within the bellows 91 and the system be in balance. By such means the operator may preset the ratio of pressures between the pipes 89 and 94 regardless of the absolute value of pressures. Any variations in pressure within the bellows 91 will position the movable element of the pilot valve 95 in proper direction and amount to establish in the pipe 94 and the bellows 93 a balancing pressure in proper ratio to the pressure within the bellows 91.

The pneumatic pressure within the pipe 94 is effective within the B chamber of the differential relay 90 and is also effective within the A chamber of a differential standardizing relay 97 which is interposed in the pipe 85 between the controller 82 and the gas control valve 86. The output of the differential relay 90 is effective as a pneumatic loading pressure through a pipe 98 upon the A chamber of the differential standardizing relay 99 which is interposed between the controller 78 and the oil control valve 87. Between the relay 97 and the valve 86 is a hand-automatic selector valve 100, while between the relay 99 and the oil control valve 87 is hand-automatic selector valve 101. These selector valves are similar to 66, 73 previously mentioned and provide the possibility of remote hand actuation or positioning of the valves 86 and 87 or of automatic positioning of said valves through the agency of the control systems.

In general it will be observed that the fuel-air ratio control equipment consists of recorder-controllers for combustion air, gas and fuel oil. The combustion air is measured and the correct amount of gas and fuel oil is then provided by positioning the gas and fuel oil control valves in accordance with the total amount of air entering the furnace. The ratio controller is provided so that the desired proportions of gas to oil may be varied by the operator as desired. As the ratio is changed the air loading pressure to each of the control valves is also changed thereby providing the correct amount of each fuel for the total amount of combustion air.

The operation of the system is as follows: Assuming the loading pressure in the pipe 77 to be representative of 100% fuel requirement to combine with the measured air supply rate then the pressure within the A chamber of relay 88 may be represented by 100. The pressure within the pipe 89, the bellows 91 and the A chamber of relay 90 is also 100. Assume that the ratio device 92 has been set by the operator for a ratio of 2:1, i. e., twice as much heat by gas as by oil, then the pressure within the bellows 93 and pipe 94 may be represented by the numeral 66.

A pressure value of 66 exists in the A chamber of the relay 97 and is effective in positioning the valve 86 to a value of 66 gas flow units. At the same time the pressure value 66 is available within the B chamber of the relay 90 opposing the value 100 in the A chamber of the relay and the difference in said pressures results in a pressure value of 33 within the pipe 98 effective upon the A chamber of relay 99. Similarly a pressure value is impressed upon the valve 87 such that the flow through the pipe 80 will represent 33 oil flow units. Thus the ratio of the pressures effective in positioning the valves 86 and 87 is 66:33 or 2:1 as previously mentioned.

In the case of the control of fuel oil a pressure is subjected upon the B chamber of the differential relay 99 from the pipe 81 representative of the measured rate of oil supply through the conduit 80. If such pressure just balances the pressure supplied through the pipe 98 then no change is made in the positioning of the valve 87 and the proper metered rate of oil supply flows through the pipe 80. If for some reason the rate of oil supply should vary, then the pressure within the pipe 81 would vary and would cease to exactly balance the demand pressure within the A chamber of the relay 99 and the valve 87 would be repositioned or readjusted in proper amount and direction to bring the rate of oil supply to that demanded by the loading pressure within the pipe 98. Similarly the relay 97 has a check-back to its B chamber from an actual measurement of the supply of gas through the pipe 84. Thus the relays 97, 99 are together subjected to loading pressures in proper proportion to each other for so positioning the fuel valves 86, 87 as to supply a total fuel heating value as dictated by the rate of supply of heated combustion air; and the individual valves 86 and 87 are readjusted to insure the desired measured proportion by directly measuring the actual rate of supply. Thus variation in supply pressure, valve characteristics, etc., are taken care of.

The gas and oil flow supply valves are primarily positioned to satisfy the total heat demand in accordance with the rate of supply of combustion air and are repositioned individually from a measure of the actual oil or gas supply rate. The ratio of heat desired to be supplied by gas to that supplied by oil is hand adjusted through the agency of the member 96 preferably upon information as to the availability of one or both of the fuels. It is not expected that the availability would vary from hour to hour or perhaps even from day to day and thus no provision is made for automatically changing the ratio upon change in availability. Furthermore, it may be that the desired change in ratio between the two fuels is a matter of economics rather than completely one of availability and this change in fuel ratio is thus purposely left in the hands of an operator.

We have described the operation of the fuel control system so far neglecting the pressure line effective upon the C chamber of relay 88. We provide herein an emergency or safety feature on fuel control whereby in the event that furnace lining temperature reaches a predetermined high value the gas and oil supply will be reduced. This is purely a limiting control for protection of the lining of the chamber 10.

At 102 we show a temperature sensitive element arranged to actuate the controller 103 for establishing a pneumatic loading pressure in a pipe 104 directly representative of temperature at a desired location in the lining of the furnace 26. Such loading pressure is effective within the B chamber of averaging relay 88 where it opposes the loading pressure from pipe 77. Adjustment of the controller 103 and of a bleed valve 105 may be such that the pressure within the B chamber of relay 88 is ineffective unless a predetermined temperature at location 102 is reached or exceeded. Thereafter the loading pressure within the pipe 104 increases to a value where it tends to nullify the effect of pressure within the A chamber of relay 88 and results in limiting the heat supply rate to the chamber 10 until the temperature at location 102 is returned below the predetermined dangerous value. Thus the temperature controller 103 provides a limiting control upon the fuel supply rate, whereby further increase is arrested at whatever rate last existed.

While we have shown the element 102 located in the lining of the combustion chamber or furnace 26 we are interested in the temperature of the products of combustion admitted from the furnace 26 to the heating chamber 10, because an excessively high temperature of the gases may soften one or more of the pellets entering the throat 30 causing other pellets to adhere and agglomerate. The furnace lining temperature is a more stable index than temperature of the combustion gas itself, i. e. not subject to momentary fluctuations.

Rate of heat supply to the chamber 10, by quantity and temperature of the products of combustion, is a function of heat release or rate of fuel supply. On the other hand, fuel-air ratio is a major factor in establishing the temperature of the products of combustion.

Actually a secondary effect takes place when the total fuel rate is limited by furnace lining temperature. Assume an increase in flow rate, or a decrease in temperature, of the fluid to be heated entering chambr 11 from conduit 31. Temperature at 69 will decrease resulting in an opening of damper 47 and increase in air flow through 28. This calls for more fuel, but assume that furnace lining temperature at 102 is at its upper limit, then combustion air rate continues to increase with no further increase in fuel rate, i. e. excess air in furnace 26 increases. The greater air volume entering 26 will be at a lower temperature because there is only so much heat in the pellets in chamber 12 through which the greater air volume rate has passed.

Thus the fuel rate entering the furnace 26 remains constant at whatever rate existed when its increase was arrested by lining temperature, and the increased volume rate of air at a lower temperature entering the furnace, results in a cooling down of the furnace lining, releasing the high temperature limit action and allowing fuel rate to increase somewhat. A balance is reached for the new condition of quantity and temperature of fluid to be heated in chamber 11 whereby heat release is increased but at a higher excess air and consequently a lining temperature safely below the preselected high limit.

It will be appreciated that the various control elements and arrangements described function continuously and simultaneously and that they are all interrelated for efficiency and safe operation of the heat transfer system towards the production of steam in the outlet conduit 32 at desired su_erheated temperature.

While we have chosen to illustrate and describe certain preferred embodiments of our invention it is to be understood that these are by way of example only and are not to be considered as limiting.

What we claim as new and desire to secure by Letters Patent of the United States is:

1. The method of operating a fluid heater of the type having three superposed chambers connected by throats with fluent gas-pervious heat transfer material in each of the chambers and in the throats and having provision for substantially continually moving such material by gravity downwardly progressively through the chambers and throats and exteriorly from the lowermost chamber back to the uppermost chamber including, maintaining a supply of heating medium to the upper chamber to heat the material as it passes therethrough, passing a fluid to be heated through the middle chamber in direct contact with the heated material passing therethrough, passing a second fluid to be heated through the lower chamber in direct contact with the heated material passing therethrough, and regulating the rate of discharge of heated fluid leaving the lower chamber conjointly responsive to rate of fluid passing through the middle chamber and to temperature of the same fluid as it leaves the middle chamber.

2. The method of claim 1 wherein the fluid leaving the lower chamber forms a constituent of the heating medium.

3. The method of claim 1 wherein the second fluid is sulphur vapor and the fluid leaving the lower chamber is air as a constituent of the heating medium.

4. The method of operating a fluid heater of the type having superposed chambers connected by a throat with fluent gas-pervious heat transfer material in each of the chambers and in the throat and having provision for substantially continually moving such material by gravity downwardly progressively through the chambers and throat and exteriorly from the lower chamber back to the upper chamber including, maintaining a supply of heating medium to the upper chamber to heat the material as it passes therethrough, passing a fluid to be heated through the lower chamber in direct contact with the heated material passing therethrough, separately supplying fuel and air for combustion to provide the supply of heating medium mentioned, comparing the supply rates of fuel and air, and utilizing such comparison in continuously controlling the rate of supply of fuel.

5. The method of operating a fluid heater of the type having three superposed chambers connected by throats with fluent gas-pervious heat transfer material in each of the chambers and in the throats and having provision for substantially continually moving such material by gravity downwardly progressively through the chambers and throats and exteriorly from the lowermost chamber back to the uppermost chamber including, maintaining a supply of heating medium comprising the products of combustion to the upper chamber to heat the material as it passes therethrough, passing a fluid to be heated through the middle chamber in direct contact with the heated material passing therethrough, passing air as an element of combustion for the supply of heating medium through the lower chamber in direct contact with the heated material passing therethrough for heating the air, supplying fuel as an element of combustion for the heating medium, separately measuring the rate of supply of the air and fuel, comparing such measurements, and continually controlling the rate of supply of fuel responsive to such comparison.

6. The method of operating a fluid heater of the type having three superposed chambers connected by throats with fluent gas-pervious heat transfer material in each of the chambers and in the throats and having provision for substantially continually moving such material by gravity downwardly progressively through the chambers and throats and exteriorly from the lowermost chamber back to the uppermost chamber including, maintaining a supply of heating medium comprising the products of combustion to the upper chamber to heat the material as it passes therethrough, passing a fluid to be heated through the middle chamber in direct contact with the heated material passing therethrough, passing air as an element of combustion for the supply of heating medium through the lower chamber in direct contact with the heated material passing therethrough for heating the air, supplying fuel oil as an element of combustion for the heating medium, measuring the rate of supply of heated air, measuring the pressure of the fuel oil before combustion, and controlling the rate of supply of fuel oil conjointly responsive to such measurements.

7. The method of operating a fluid heater of the type having an upper and a lower chamber connected by a structurally unobstructed throat of reduced cross-section with fluent gas-pervious heat transfer material in the chambers and throat and having provision for substantially continually moving such material by gravity downwardly progressively through the chambers and throat and exteriorly from the lower chamber back to the upper chamber including, maintaining a supply of heating medium to the upper chamber to heat the material as it passes therethrough, passing a fluid to be heated through the lower chamber in direct contact with the material passing therethrough and thence through a separate unheated reactor chamber, and simultaneously controlling the rate of discharge of heating medium from the upper chamber and the rate of discharge of fluid from the reactor responsive to pressure differential across the throat.

8. The method of operating a fluid heater of the type having an upper and a lower chamber connected by a structurally unobstructed throat of reduced cross-section with fluent gas-pervious heat transfer material in the chambers and throat and having provision for substantially continually moving such material by gravity downwardly progressively through the chambers and throat and exteriorly from the lower chamber back to the upper chamber including, maintaining a supply of heating medium to the upper chamber to heat the material as it passes therethrough, passing a fluid to be heated through the lower chamber in direct contact with the material passing therethrough and thence through a separate unheated reactor chamber, and so controlling both the rate of discharge of heating medium from the upper chamber and the rate of discharge of fluid from the reactor as to minimize fluid passage through the throat from one chamber to another.

9. The method of claim 8 wherein the control of the two flows is sequential in nature following a predetermined pattern.

10. The method of operating a fluid heater of the type having an upper and a lower chamber connected by a structurally unobstructed throat of reduced cross-section with fluent gas-pervious heat transfer material in the chambers and throat and having provision for substantially continually moving such material by gravity downwardly progressively through the chambers and throat and exteriorly from the lower chamber back to the upper chamber including, maintaining a supply of heating medium to the upper chamber to heat the material as it passes therethrough, passing sulphur vapor to be heated through the lower chamber in direct contact with the material passing therethrough and thence through a separate unheated charcoal reactor chamber, and so controlling both the rate of discharge of heating medium from the upper chamber and the rate of discharge of product fluid from the reactor as to preclude dilution of the fluid in either chamber by fluid from the other chamber.

11. The method of operating a fluid heater of the type having an upper and a lower chamber connected by a structurally unobstructed throat of reduced cross-section with fluent gas-pervious heat transfer material in the chambers and throat and having provision for substantially continually moving such material by gravity downwardly progressively through the chambers and throat and exteriorly from the lower chamber back to the upper chamber including, passing a fluid to be heated through the lower chamber in direct contact with the material passing therethrough, separately supplying air and two dissimilar fluid fuels for combustion to the unit to provide a heating medium to the upper chamber to heat the material as it passes therethrough, separately measuring the rate of supply of the air and fuels, utilizing the measure of air as a demand index for fuel, establishing a desired ratio between the two fuels, and proportioning the total fuel supply to the demand index while maintaining the desired ratio between the fuels.

12. The method of claim 11 including limiting the supply rate of total fuel responsive to a temperature within the upper chamber.

13. The method of claim 11 including the step of automatically preventing any further increase in the rate of supply of the two fuels when a temperature within the upper chamber reached a predetermined high value.

14. The method of operating a fluid heater of the type having an upper and a lower chamber connected by a structurally unobstructed throat of reduced cross-section with fluent gas-pervious heat transfer material in the chambers and throat and having provision for substantially continually moving such material by gravity downwardly progressively through the chambers and throat and exteriorly from the lower chamber back to the upper chamber including, passing a fluid to be heated through the lower chamber in direct contact with the material passing therethrough, separately supplying air and fuel for combustion to the unit to provide a heating medium to the upper chamber to heat the material as it passes therethrough, separately measuring the rate of supply of air and fuel, utilizing the measure of air as a demand index for fuel, proportioning the fuel supply to the demand index, and limiting the supply rate of fuel responsive to a temperature within the upper chamber.

15. The method of claim 14 wherein the limiting step includes automatically preventing any further increase in the rate of supply of fuel when a temperature within the upper chamber reaches a predetermined high value.

16. The combination with a fluid heater having an upper chamber enclosing a fluent gas-pervious mass of solid heat transfer material, a lower chamber enclosing a mass of such material, a passage forming a throat between said upper and lower chambers and enclosing a mass of such material connecting said material masses, means external of said chambers and throat to return the material from an exit in the lower chamber to an inlet to the upper chamber, of a heating medium supply for the material in the upper chamber, a supply of fluid to be heated passed through the lower chamber in direct contact with the heated material therein, a first damper arranged to regulate the rate of discharge of heating medium from the upper chamber, a separate unheated reactor chamber to which the fluid to be heated is discharged from the lower chamber, a second damper in the discharge conduit from the reactor chamber, and a differential pressure controller sensitive to flow differential pressures across the throat arranged to simultaneously position the said dampers.

17. The combination of claim 16 including means for positioning the dampers in preselected sequence.

18. The combination with a fluid heater having an upper chamber enclosing a fluent gas-pervious mass of solid heat transfer material, a lower chamber enclosing a mass of such material, a passage forming a throat between said upper and lower chambers and enclosing a mass of such material connecting said material masses, means external of said chambers and said throat to return the material from an exit in the lower chamber to an inlet to the upper chamber, of a heating medium supply for the material in the upper chamber, a supply of sulphur vapor to be heated passed through the lower chamber in direct contact with the heated material therein, a first valve means arranged to regulate the rate of discharge of heating medium from the upper chamber, a separately located unheated charcoal reactor chamber to which the heated sulphur vapor is discharged from said lower chamber, a second valve means arranged to regulate the rate of discharge of product fluid from the reactor chamber, and a differential pressure controller sensitive to pressures at locations spaced along said throat arranged to sequentially position said valve means in accordance with preselected pressure differential conconditions across the throat.

19. The combination with a fluid heater having superposed chambers connected by a structurally unobstructed throat of reduced cross-section, a mass of fluent gas-pervious heat transfer material in the form of pellets confined by the chambers and throat, said mass substantially continually moving progressively downwardly by gravity through the chambers and throat, means returning the pellets from an exit from the lower chamber to an inlet to the upper chamber, of a heating medium supply for the material in the upper chamber, a supply of a fluid to be heated passed through the lower chamber in direct contact with the heated material therein, separate supply systems for fuel and air for combustion to provide the heating medium, a rate meter for the fuel, a rate meter for the air, means for comparing the manifestations of said rate meters, and control means for regulating the rate of supply of fuel responsive to the comparing means.

20. The combination with a fluid heater having three superposed chambers connected by structurally unobstructed throats of reduced cross-section, a mass of fluent gas-pervious heat transfer material in the form of pellets confined by the chambers and throats, said mass substantially continually moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of air as an element of combustion for the supply of heating medium passed through the lowermost chamber in direct contact with the heated material therein for heating the air, a supply system for fuel for combustion to form the heating medium, a regulating valve in said fuel supply system, a rate meter for the fuel, a rate meter for the air, means for comparing the manifestations of said rate meters, and control means for the valve responsive to the said comparing means.

21. The combination with a fluid heater having three superposed chambers connected by structurally unobstructed throats of reduced cross-section, a mass of fluent gas-pervious heat transfer material in the form of pellets confined by the chambers and throats, said mass substantially continually moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of air as an element of combustion for the supply of heating medium passed through the lowermost chamber in direct contact with the heated material therein for heating the air, a supply system for fuel oil for combustion to form the heating medium, a regulating valve in said fuel supply system, a pressure responsive meter for the fuel oil before combustion, a rate meter for the heated air, means correlating the manifestations of said meters, and control means for the valve responsive to the correlating means.

22. The combination with a fluid heater having three superposed chambers connected by structurally unobstructed throats of reduced cross-section, a mass of fluent gas-pervious heat transfer material in the form of pellets confined by the chambers and throats, said mass substantially continuously moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of a second fluid to be heated passed through the lowermost chamber in direct contact with the heated material therein, valve means in the discharge of the heated fluid leaving the lower chamber, and means responsive to temperature of the heated fluid leaving the middle chamber adapted to position the said valve means.

23. The combination with a fluid heater having three superposed chambers connected by structurally unobstructed throats of reduced cross-section, a mass of fluent gas-pervious heat transfer material in the form of pellets confined by the chambers and throats, said mass substantially continually moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of a second fluid to be heated passed through the lowermost chamber in direct contact with the heated material therein, a conduit joining the second fluid outlet from the lower chamber to the heating medium supply, a valve means in said conduit, and means sensitive to temperature of the first fluid at a predetermined location adapted to position the valve means.

24. The combination with a fluid heater having three superposed chambers connected by structurally unobstructed throats of reduced cross-section, a mass of fluent gas-pervious heat transfer material in the form of pellets confined by the chambers and throats, said mass substantially continuously moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of air for combustion to provide the heating medium to be heated passed through the lowermost chamber in direct contact with the heated material therein, a conduit joining the heated air outlet from the lower chamber to the heating medium supply, a valve means in said conduit, and means sensitive to temperature of the first fluid at a predetermined location adapted to position the valve means.

25. The combination with a fluid heater having three superposed chambers connected by structurally unobstructed throats of reduced cross-section, a mass of fluent gas-pervious heat transfer material in the form of pellets confined by the chambers and throats, said mass substantially continuously moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of a second fluid to be heated passed through the lowermost chamber in direct contact with the heated material therein, valve means in the discharge of the heated fluid leaving the lower chamber, and means conjointly responsive to rate of flow and temperature of the fluid passing through the middle chamber and arranged to position the valve means.

26. The combination with a fluid heater having three superposed chambers connected by structurally unobstructed throats of reduced cross-section, a mass of fluent gas-pervious heat transfer material in the form of pellets confined by the chambers and throats, said mass substantially continuously moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of air for combustion to provide the heating medium passed through the lowermost chamber in direct contact with the heated material therein, a conduit leading the heated air from the lower chamber to the heating medium supply, a valve means in said conduit, measuring means sensitive to temperature of the first fluid at a predetermined location, measuring means sensitive to rate of flow of the first fluid through the middle chamber, and control means for the valve responsive to both said measuring means.

27. The combination with a fluid heater having three superposed chambers connected by structurally unobstructed throats of reduced cross-section, a mass of fluent gas-pervious heat transfer material in the form of pellets confined by the chambers and throats, said mass substantially continuously moving progressively downwardly by gravity through the chambers and throats, means returning the pellets from an exit from the lowermost chamber to an inlet to the uppermost chamber, of a heating medium supply for the material in the uppermost chamber, a supply of sulphur vapor to be heated passed through the middle chamber in direct contact with the heated material therein, a supply of air for combustion to provide the heating medium passed through the lowermost chamber in direct contact with the heated material therein, a conduit leading the heated air from the lower chamber to the heating medium supply, a valve means in said conduit, measuring means sensitive to temperature of the sulphur vapor as it leaves the middle chamber, a rate of flow meter of the sulphur vapor, and control means for the valve conjointly responsive to said measuring means and to said rate of flow meter.

28. The combination with a fluid heater having superposed chambers connected by a structurally unobstructed throat of reduced cross-section, a mass of fluent gas-pervious heat transfer material in the form of pellets confined by the chambers and throat, said mass substantially continually moving progressively downwardly by gravity through the chambers and throat, means returning the pellets from an exit from the lower chamber to an inlet to the upper chamber, of a heating medium supply for the material in the upper chamber, a supply of a fluid to be heated passed through the lower chamber in direct contact with the heated material therein, separate supply systems for air and two dissimilar fluid fuels for combustion to the unit to provide the heating medium, a first rate meter for the air, a second rate meter for one fluid fuel, a third rate meter for the other fluid fuel, means controlling both fuels responsive to the air rate meter, and means for establishing a preselected ratio between the rates of supply of the two fuels.

29. The combination of claim 28 including means limiting the supply rate of total fuel responsive to a measure of temperature within the upper chamber.

30. The combination of claim 28 including a temperature measuring device responsive to a temperature within the upper chamber, and limiting means actuated by said temperature measuring device and adapted to prevent further increase in the rate of supply of both fuels when said temperature reaches a predetermined high value.

31. The combination of claim 28 including means sensitive to a temperature in the operation of the fluid heater and arranged to prevent further increase in rate of supply of fuel to the heater when the said temperature reaches a predetermined high value.

32. The combination with a fluid heater having superposed chambers connected by a structurally unobstructed throat of reduced cross-section, a mass of fluent gas-pervious heat transfer material in the form of pellets confined by the chambers and throat, said mass substantially continually moving progressively downwardly by gravity through the chambers and throat, means returning the pellets from an exit from the lower chamber to an inlet to the upper chamber, of a heating medium supply for the material in the upper chamber, a supply of a fluid to be heated passed through the lower chamber in direct contact with the heated material therein, separate supply systems for air and fuel for combustion to the unit to provide the heating medium, a rate meter for the air, means controlling the fuel supply system responsive to the air rate meter, a temperature responsive means sensitive to a temperature within the upper chamber and means modifying the control of the fuel supply system by the temperature responsive means.

33. The combination with a fluid heater having superposed chambers connected by a structurally unobstructed throat of reduced cross-section, a mass of fluent gas-pervious heat transfer material in the form of pellets confined by the chambers and throat, said mass substantially continually moving progressively downwardly by gravity through the chambers and throat, means returning the pellets from an exit from the lower chamber to an inlet to the upper chamber, of a heating medium supply for the material in the upper chamber, a supply of a fluid to be heated passed through the lower chamber in direct contact with the heated material therein, the heating medium supply including a combustion chamber for producing heated products of combustion, a duct supplying air to the combustion chamber, a first conduit supplying a first fluid fuel to the combustion chamber, a second conduit supplying a second fluid fuel to the combustion chamber, a first valve in the first conduit, a second valve in the second conduit, measuring means for the air providing a pneumatic loading pressure continually representative of the rate of supply of air for combustion, hand adjustable means for dividing the effect of said loading pressure into two secondary loading pressures selectively proportioned to each other, means for imposing the secondary loading pressures one upon each of the said valves, measuring means establishing a modifying loading pressure representative of actual rate of supply of the first fluid fuel arranged to subject the modified loading pressure upon the related imposing means, and measuring means establishing a modified loading pressure representative of the actual rate of supply of the second fluid fuel arranged to subject much modified loading pressure upon the related imposing means, whereby each fuel supply valve will be positioned conjointly responsive to a proportionate part of the demand index air and responsive to a measure of the actual rate of supply of fuel.

34. The combination of claim 33 including means continually establishing a pneumatic loading pressure representative of a temperature within the upper chamber arranged to impose such loading pressure as a limiting factor upon the two valves.

PAUL R. GROSSMAN.
JACK F. SHANNON.

REFERENCES CITED

The following references are of record in the file of this patent:

UNITED STATES PATENTS

| Number | Name | Date |
|---|---|---|
| 1,348,589 | Seeger | Aug. 3, 1920 |
| 2,143,820 | Payn | Jan. 10, 1939 |
| 2,201,946 | Krogh | May 21, 1940 |
| 2,258,729 | Best | Oct. 14, 1941 |
| 2,259,417 | Gorrie | Oct. 14, 1941 |
| 2,399,450 | Ramseyer | Apr. 30, 1946 |
| 2,417,049 | Bailey et al. | Mar. 11, 1947 |
| 2,447,306 | Bailey et al. | Aug. 17, 1949 |
| 2,486,627 | Arnold | Nov. 1, 1949 |